(No Model.)

G. C. BIGELOW.
BARBED WIRE FENCE.

No. 278,389. Patented May 29, 1883.

Witnesses.
S. N. Piper
E. B. Pratt

Inventor.
Geo. Convers Bigelow
by R. H. Eddy atty.

UNITED STATES PATENT OFFICE.

GEORGE C. BIGELOW, OF WORCESTER, MASSACHUSETTS.

BARBED-WIRE FENCE.

SPECIFICATION forming part of Letters Patent No. 278,389, dated May 29, 1883.

Application filed February 13, 1883. (No model.)

*To all whom it may concern:*

Be it known that I, GEORGE CONVERS BIGELOW, of the city and county of Worcester, of the Commonwealth of Massachusetts, have invented a new and useful Improvement in Barbed-Wire Fences; and I do hereby declare the same to be described in the following specification and represented in the accompanying drawings, of which—

Figure 1:
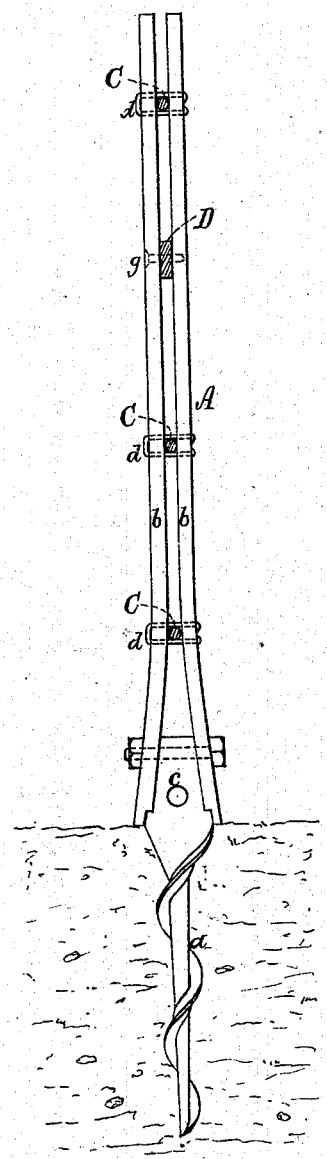
Figure 2:
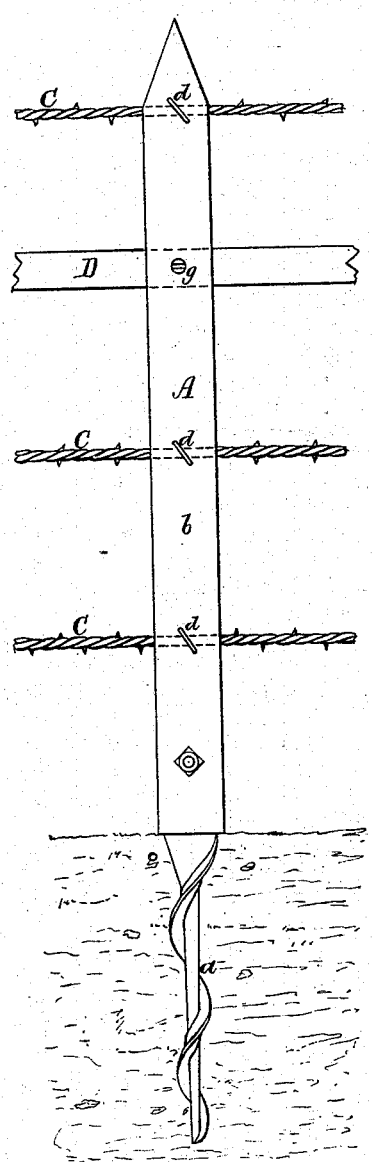

Figure 1 is a view in transverse section, and Fig. 2 an elevation, of part of a fence of my improved construction, with its cattle-guard and barbed wires, the nature of my invention being defined in the claim hereinafter presented.

One characteristic feature of the fence to be described is its posts, one of which is shown at A in the drawings, it being composed of a screw-threaded tapering foot, or, in other words, a tapering screw, $a$, and two pickets, $b$ $b$, extended upward from the head of such screw and bolted thereto. The said head of the screw has a hole, $c$, in or through it, such hole being to receive a bar to be used for the purpose of revolving the screw to cause it to enter the ground. The screw-head is constructed so as to cause the pickets, where connected to it, to be farther apart than above it. Barbed wires C go between the pickets of each post, and are secured to the said pickets and held in their positions by staples $d$, driven through the pickets and arranged with the wires in manner as represented in the drawings, such staples being clinched at their ends projecting beyond the pickets. As each staple has a wire going through it or between its legs, such staple, after being clinched, serves not only to support the wire, but to firmly connect the two pickets. Furthermore, there is arranged between the upper and uppermost wires a wooden bar, D, which is what I term the "cattle-guard," its purpose being twofold—namely, to strengthen the fence and aid in maintaining the pickets in their upright positions, and to serve to cattle or animals as an indicator of the existence of the fence, in order to prevent them from running in contact with the barbs of the wires thereof and being injured thereby. The cattle-guard is secured to the pickets by a screw, $g$, arranged with and screwed into them, as shown in Fig. 1.

In setting up the fence the screws $a$ are to be first screwed at suitable distances apart into the ground, after which two pickets, $b$, are to be applied and bolted to the head of such screw. The wires and cattle-guard are next to be extended from post to post, between the two pickets thereof, and arranged with and secured thereto in manner as described. The screws $a$, when in the ground, cause the posts to be firmly fixed in their upright positions, and being fastened to the pickets, and the posts being connected by the cattle-guard and barbed wires, the screws $a$ are firmly held in place or prevented from being revolved in order to loosen them in or detach them from the ground.

A very durable and excellent fence can thus be rapidly constructed at little expense, comparatively speaking.

I claim—

The fence substantially as described, consisting of screws $a$, two pickets, $b$, bolted to each of them, as explained, a series of wires extended from post to post between the two pickets of each, and staples going through the pickets and embracing the wires and clinched on the posts, as represented.

GEORGE CONVERS BIGELOW.

Witnesses:
 F. MANN,
 GEO. J. MERRITT.